F. SCHREIBER & A. WEIGAND.
Insect-Trap.

No. 200,574.      Patented Feb. 19, 1878.

Witnesses.
Otto Hufeland.
Robt. E. Miller.

Inventors.
Franz Schreiber
Anton Weigand
by
VanSantvoord & Hauff
their attorneys

UNITED STATES PATENT OFFICE.

FRANZ SCHREIBER AND ANTON WEIGAND, OF NEW YORK, N. Y.

IMPROVEMENT IN INSECT-TRAPS.

Specification forming part of Letters Patent No. 200,574, dated February 19, 1878; application filed December 28, 1877.

*To all whom it may concern:*

Be it known that we, FRANZ SCHREIBER and ANTON WEIGAND, both of the city, county, and State of New York, have invented a new and useful Improvement in Insect-Traps, which improvement is fully set forth in the following specification, reference being had to the accompanying drawing, in which—

Figure 1:
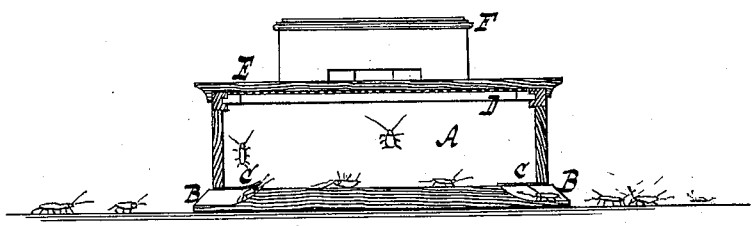
Figure 2:
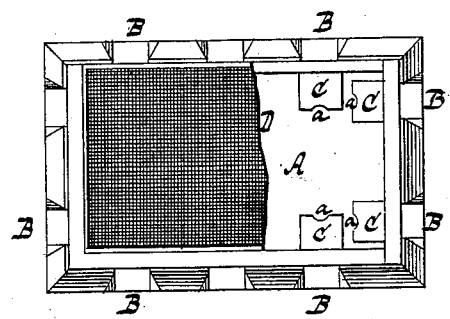

Figure 1 represents a longitudinal section of our trap. Fig. 2 is a plan or top view of the cage, part of the screen being broken away to expose the interior of the cage.

Similar letters indicate corresponding parts.

Our invention relates to traps for catching cockroaches and other insects; and consists in a cage or box having one or more inlet-apertures, which are provided with flap-valves or gates, made of mica, and arranged to open inwardly, but prevented from opening outward by their jambs or seats, against which they are snugly forced by their elasticity. These inlet-apertures are formed in the lower part of the cage or box, so that when the latter is properly baited and placed upon a table, floor, or other place where the insects are in the habit of gathering, they may easily see through the mica valves or gates, and be enticed by the bait.

On the upper part of the trap is arranged a removable foraminous screen or lid, through which hot water or other liquid can be poured, for the purpose of destroying the captured insects, and by opening which their remains may be removed.

In the accompanying drawings, Figure 1 represents a longitudinal section of our trap. Fig. 2 is a plan or top view of the cage, part of the screen being broken away to expose the interior of the cage.

The letter A designates the cage or box, and B the inlet apertures or entrances, in this case consisting of inclined passages cut through the bottom board of the box. The valves or gates C are made of mica, which, being a transparent material, gives the insects a view of the bait within the trap, and, being elastic and the gates having their inner ends and sides free, said gates may be easily forced upward by an insect seeking access to the bait. These gates, at their outer ends, are firmly secured to the bottom edges of the side walls of the box, and are large enough to completely cover and extend inward and sidewise beyond the inner opening of the inlet-apertures, thus resting upon the floor of the trap, by which they are prevented from being opened outward.

If desired, notches *a* may be formed in the inner edges of the mica gates, to facilitate their opening, and also to allow the smell of the bait to reach the insects.

The letter D indicates a foraminous screen, arranged in a suitable frame, which may be removed for the purpose of baiting the trap, or for removing the dead insects after they have been killed by hot water, as before explained.

The screen D may be covered by a removable top, E, which may be surmounted by a secondary trap, similar to that heretofore described, or of any other desired construction.

In setting the trap, the cover and screen should be temporarily removed, so that the bait may be introduced; and in order that these parts may be removed and replaced, so as to remain securely in position, I form grooves in the inner sides of the box or trap walls, and tongues on the edges of the screen-frame, as shown in Fig. 1, so that said frame may slide in or out, one of the side walls being cut away sufficiently to afford a passage for said frame. The cover E is provided with a downward-projecting flange, so as to fit upon the trap after the manner of a cheese-box trap. For baiting the trap, I use scraps of cheese, fat meat, bread-crumbs, and similar table refuse.

Traps have heretofore been provided with flap-valves or gates opening inward, and operating in a manner similar to ours; but such gates have been made of materials but ill-suited for such use—as, for instance, leather, wood, wire gauze and grating, and bristles. The first two and last are objectionable, because they do not permit the insects to see the bait, so that the trap must be made of a transparent or foraminous or reticulated material, and on account of warping, and permitting the insects to pass in and out at will; the second two on account of rusting and losing their elasticity, and also because of the imperfect view they afford of the interior of the trap, and the difficulty of making them light enough to be easily moved by the insects, and at the same time sufficiently resilient to close promptly when the pressure of opening is removed.

All these objections we have overcome by using thin sheets of mica for our gates. A gate of this material permits the insect to have a good view of the bait which is placed to lure it, is sufficiently elastic to close snugly and promptly to its seat, and will not rust or warp.

We do not claim a trap with gates or valves of any of the other materials named; but

What we claim is—

A roach or insect trap provided with mica valves or gates, substantially as and for the purpose set forth.

In testimony that we claim the foregoing we have hereunto set our hands and seals this 21st day of December, 1877.

FRANZ SCHREIBER. [L. S.]
      ANTON WEIGAND. [L. S.]

Witnesses:
  W. HAUFF,
  E. F. KASTENHUBER.